United States Patent [19]

Stoilov et al.

[11] Patent Number: 5,376,348
[45] Date of Patent: Dec. 27, 1994

[54] METHOD FOR MAKING SILICA GEL WTIH A LARGE ACTIVE SURFACE AREA

[75] Inventors: Georgi T. Stoilov; Vladimir G. Stoilov; Boiko G. Stoilov; Christo T. Chervenkov; Pavel A. Lazov, all of Sofia, Bulgaria

[73] Assignee: Kamina Ltd., Sofia, Bulgaria

[21] Appl. No.: 180,533

[22] Filed: Jan. 13, 1994

Related U.S. Application Data

[63] Continuation of Ser. No. 959,776, Oct. 13, 1992, abandoned.

[30] Foreign Application Priority Data

Oct. 14, 1991 [BG] Bulgaria .................................. 95317
Oct. 14, 1991 [BG] Bulgaria .................................. 95318
Oct. 14, 1991 [BG] Bulgaria .................................. 95319

[51] Int. Cl.$^5$ .............................................. C01B 33/12
[52] U.S. Cl. .................................. 423/338; 252/315.6
[58] Field of Search ................ 423/338; 252/315.6; 502/12

[56] References Cited

U.S. PATENT DOCUMENTS

| | | | |
|---|---|---|---|
| 2,358,201 | 9/1944 | Behrman | 423/338 |
| 2,481,825 | 9/1945 | Connolly | 252/317 |
| 2,483,868 | 10/1949 | Archer et al. | 423/338 |
| 2,785,051 | 3/1957 | Miller | 423/338 |
| 3,070,426 | 12/1962 | Winyall | 423/338 |
| 3,203,760 | 8/1965 | Winyall | 423/338 |
| 3,313,739 | 4/1967 | Acker et al. | 252/451 |
| 3,501,269 | 3/1970 | Winyall et al. | 423/338 |
| 4,595,578 | 6/1986 | Cohen et al. | 423/338 |
| 5,017,354 | 5/1991 | Simms et al. | 423/338 |

OTHER PUBLICATIONS

Bulgarian Author's Certificate No. 12035, "Method for Preparing Silica Gel With A Micro Porous Structure and a Large Active Surface", Priority date Nov. 12, 1966.

Primary Examiner—Olik Chaudhuri
Assistant Examiner—Ken Horton
Attorney, Agent, or Firm—Skadden, Arps, Slate, Meagher & Flom

[57] ABSTRACT

A method is described for making silica gel having a large active surface area suitable for use as an adsorbent-separator of gases and liquids in hermetically sealed acid accumulators and as a filler in the fabrication of rubber articles.

The method produces silica gel having a large active surface area and, at the same time, a microgranular structure. The product is in the form of aggregates having a size which generally does not exceed 5 mm, so no additional grinding of the product is required. The silica gel exhibits a large pore volume.

2 Claims, No Drawings

METHOD FOR MAKING SILICA GEL WITH A LARGE ACTIVE SURFACE AREA

This application is a continuation, of application Ser. No. 07/959,776, filed Oct. 13, 1992, now abandoned.

FIELD OF THE INVENTION

The invention relates to a method of making silica gel having a large surface area which can be used for gas and liquid filtering, as an adsorbent-separator in hermetically sealed acid accumulators, or as a filter in rubber article production among other possible uses.

BACKGROUND OF THE INVENTION

A method for making silica gel having a large active surface area is known in which a sodium silicate solution with a specific gravity of 1.10 and a sulfuric acid solution with a specific gravity of 1.20 are mixed at a ratio of 100 to 15 parts by volume, the sulfuric acid solution being poured into the sodium silicate solution. The gelled mass thus produced is aged at a temperature of 20° C. to 25° C. for 24 hours, then is dried at a temperature of 30° C. to 40° C. The gelled mass is, subsequently, treated with 3% sulfuric acid solution, is washed several times with distilled water, and is aged again at a temperature of up to 100° C.

A disadvantage of the method is the impossibility of making silica gel having a sufficiently large active surface area and, at the same time, a microgranular structure. The product of the known method includes comparatively large aggregates of particles. The particles contain amorphous fragments that require additional crushing. Such additional crushing is often undesirable because it is associated with product contamination.

A method of making silica gel having a large active surface area is also known, in which a sodium silicate solution containing 9.9% to 21.4% by mass of silicon dioxide is added to 3.6 to 9.3 normal sulfuric acid solution at a volume ratio of 4 or 5 to 1 and the resulting gel mass is aged at room temperature or at a temperature of 60° C. for 45 to 120 minutes. The gelled mass is then washed with 0.2 normal sulfuric acid solution and, finally, is dried at 200° C.

Disadvantages of the method are the usage of high concentration initial reagents that require mixers of special types in order to produce a sufficiently homogenized gel mass, the necessity of crushing the final product by means of a crushing apparatus, and the production of silica gel having comparatively small pore volume. Relatively low pore volume makes the use of the product as an adsorbent-separator in hermetically sealed acid accumulators difficult.

An object of the invention is the provision of a method for making silica gel having a large active surface area and, at the same time, a microgranular structure. The method should produce aggregate particles of small size that require no additional grinding and that have large pore volume. Furthermore, the method should utilize initial reagents with comparatively low concentrations and avoid the use of mixers of special types.

SUMMARY OF THE INVENTION

Among the advantages of the method of the invention are that the obtained silica gel has a large active surface area and at the same time a microgranular structure; the product includes aggregates of small sizes that require no additional grinding; the product pores have a large water volume that makes it especially suitable for use as an adsorbent-separator in hermetically sealed acid accumulators; and reagents of comparatively low concentrations are used for making the silica gel, thus avoiding the use of mixers of special types.

DETAILED DESCRIPTION OF THE PREFERRED EMBODIMENTS

In the preferred method of making silica gel of the present invention, a chemically pure solution of water-glass ($Na_2O_n \cdot SiO_2$) with a specific gravity of about 1.10 and a chemically pure solution of sulfuric acid having a specific gravity of about 1.20 are contacted in a proportion of about 100 to 15 parts by volume. The water-glass is poured onto the surface of the sulfuric acid while it is gently and continuously stirred in a glass vessel. A chemical reaction takes place between the water-glass and the sulfuric acid which produces water, sodium sulfate, and silica. They are in a gel form.

The gel is placed on specially perforated dishes to hasten coagulation. The gel is held at a temperature in the range of about 20° C. to about 25° C. for a period of about 24 hours during which the gel, which had the appearance of a gelled mass, coagulates into aggregates of solid particles. The particles are maintained at a temperature of about 30° C. to 40° C., such as by infra-red lamps, until the aggregates of silica gel contain residual moisture in the range of 36 to 38 weight percent.

The dried aggregates of silica gel are next washed with a 3 weight percent sulfuric acid solution and then washed several times with distilled water until essentially no sodium sulfate or sulfuric acid can be detected by conventional laboratory means in the wash water. The water washed aggregates are separated from the wash water by, for example, centrifugation, air convection, or filtration, preferably vacuum filtration. The water washed aggregates are dried, as in ovens fitted with infra-red lamps, at a temperature up to about 100° C. for a period of from about 6 to about 10 hours. After the drying, the silica gel aggregates are placed in airtight plastic or glass vessels until use.

Preferably, the silica gel has a microgranular structure and an active surface area in the range of about 600 to about 800 square meters per gram as measured by the Brunauer, Emmett Teller (B.E.T.) method.

The method of this invention will become clearer by the following example.

EXAMPLE 12.5 liters of a sodium silicate solution with a modulus of 2.84 ($Na_2O \cdot 2.84SiO_2$) are dissolved in distilled water to obtain a specific gravity of 1.10 (volume of 100 liters) are added to 4.4 liters of sulfuric acid dissolved in distilled water to obtain a specific gravity of 1.20 (6.8 N.) (volume of 15 liters) while stirring to produce a final gelling pH of 7.8. The resulting gel was aged at room temperature for 24 hours and then was dried to 40° C. so as to obtain a residual moisture content of 38%. The intermediate product thus obtained was washed with 3% sulfuric acid for 30 minutes and then was washed with distilled water until the sulfate ion content in the wash water was below 0.08%. After that, the intermediate product was dried at a temperature of 80° C.

The end product had a specific surface area of 670 $m^2/g$, a pore volume of 1.15 $cm^3/g$, a predominating pore radius of 30 Å, and a pore volume of 1.96 ml/g. The particle aggregate size was below 5 mm.

The above example is intended to further communicate the instant invention, and not to limit the scope of the invention in any way. The scope of the invention is as broad as the claims permit, and includes readily apparent variations of the described embodiments which may be suggested to those who study this disclosure.

What is claimed is:

1. A method of manufacturing silica gel having a microgranular structure and an active surface area of about 600 to about 860 square meters per gram, said method consisting of:

mixing a solution of sodium silicate having a specific gravity of about 1.10 with aqueous sulfuric acid having a specific gravity of about 1.20 in a proportion of approximately 100 to 15 by volume by continuously stirring the sulfuric acid and pouring the sodium silicate solution into the continuously stirred sulfuric acid solution to produce a gelled aggregate having a final pH from 7 to 8.5;

aging the resulting gel at a temperature of 20° C. to 25° C.;

drying the gelled aggregate at a temperature in the range of about 30° C. to about 40° C. to obtain a residual moisture content in the range of about 36 to about 38 weight percent;

washing the partially dried aggregate with a dilute aqueous sulfuric acid solution having a concentration of about 3 weight percent to produce a sulfuric acid washed aggregate;

washing the sulfuric acid washed aggregate with distilled water to produce a water washed aggregate; and drying the water washed aggregate at a temperature in the range of about 80° C. to about 100° C., whereby the silica gel having the microgranular structure and the active surface area of about 600 to about 800 square meters per gram is manufactured using starting materials of the sodium silicate solution and the sulfuric acid, without an additional grinding step after the introduction of the starting materials.

2. The method of claim 1 wherein the dilute aqueous sulfuric acid solution has a concentration in the range of about 2.9 to about 3.2 weight percent, calculated as $H_2SO_4$.

* * * * *